United States Patent Office 2,841,614
Patented July 1, 1958

2,841,614

PRODUCTION OF TRICYCLODECANE-DICARBOXYLIC ACID

Karl Büchner, Duisburg-Hamborn, and Josef Meis, Oberhausen-Osterfeld, Germany, assignors to Ruhrchemie Aktiengesellschaft, Oberhausen-Holten, Germany, a corporation of Germany No Drawing. Application November 10, 1953
Serial No. 391,374

Claims priority, application Germany November 25, 1952

13 Claims. (Cl. 260—514)

This invention relates to improvements in the production of tricyclodecane-dicarboxylic acid.

One object of the invention is the production of tricyclodecane-dicarboxylic acid from tricyclodecane-dimethylol. This, and still further objects, will become apparent from the following description:

In accordance with the invention it has been found that tricyclodecane-dimethylol reacts with molten caustic alkalis at temperatures below 300° C. and preferably temperatures of 250°–260° C. to thereby split off hydrogen, i. e., 4 mols of hydrogen per mol of tricyclodecane-dimethylol. In this reaction both methylol groups are converted to carboxylic groups in the form of their salts. After cooling, a solid salt cake is obtained which will dissolve in water without leaving a residue and from the aqueous solution of which the free dicarboxylic acid may be obtained by treatment with mineral acid.

The process in accordance with the invention may be illustrated by the following reaction equations:

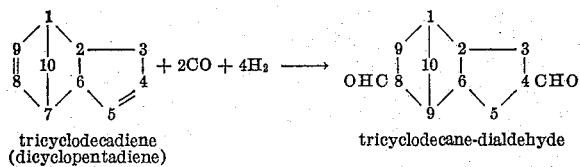

tricyclodecadiene (dicyclopentadiene) → tricyclodecane-dialdehyde

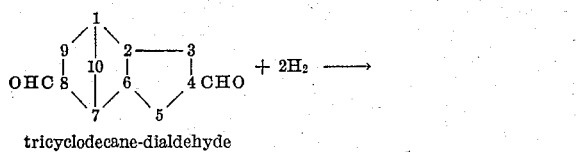

tricyclodecane-dialdehyde

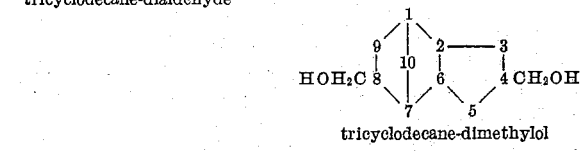

tricyclodecane-dimethylol

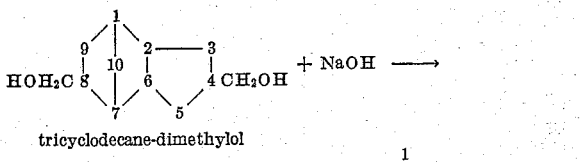

tricyclodecane-dicarboxylic sodium

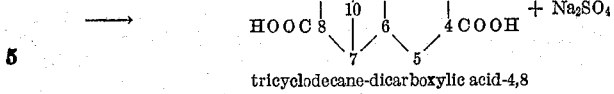

tricyclodecane-dicarboxylic acid-4,8

Dicyclopentadiene is at first catalytically treated with carbon monoxide-hydrogen mixtures using the methods of the oxo synthesis as modified in accordance with the invention. This results in the formation of tricyclodecane-dialdehyde which is hydrogenated to give tricyclodecane-dimethylol. By reacting the latter with molten alkali, the sodium salt of tricyclodecane-dicarboxylic acid is obtained from which, by means of mineral acids, the free tricyclodecane-dicarboxylic acid-4,8 may be obtained.

This is a hitherto unknown new dicarboxylic acid. Up to the present there has been described by Prelog and Seiwerth (Berichte der deutschen chemischen Gesellschaft, vol. 74, 1644 (1941)), a dicarboxylic acid, the fundamental substance of which is symmetrical tricyclodecane (adamantane). The tricyclodecane-dicarboxylic acid thus formed contains the two carboxyl groups attached to a quaternary carbon atom each. Another dicarboxylic acid has been described by Reppe (Annalen der Chemie, vol. 560, 25–26 (1948)). The skeleton of this dicarboxylic acid consists of two rings with 6 carbon atoms and one ring with 4 carbon atoms. The two carboxyl groups are attached to the same ring in neighboring position.

As contrasted to the hitherto known dicarboxylic acids mentioned above, the new tricyclodecane-dicarboxylic acid-4,8 contains their carboxyl groups in different rings attached to tertiary carbon atoms and has as skeleton the asymmetrical tricyclodecane.

It is preferable to react the tricyclodecane-dimethylol with a slight excess of caustic alkali above the quantity calculated for reaction with both hydroxyl groups, as, for example, 110–120% of the theoretically required quantity. The reaction may be brought to completion at a temperature of 250° C. within a short time, as, for example, within 20–30 minutes.

It is preferable for the reaction with molten alkali to use the alkali, especially caustic soda, in a finely disintegrated form or in the form of granules or tablets. It is also possible to operate with a concentrated solution of about 40% NaOH. Instead of using caustic soda, the reaction with molten alkali may be effected in an analogous manner with caustic potash or mixtures of caustic potash and caustic soda, especially with a eutectic mixture of caustic soda and caustic potash melting at 167° C.

The temperatures in the reaction of tricyclodecane-dimethylol with molten alkali are not as high as in the known reaction of aliphatic monoalcohols with molten alkali. With aliphatic monoalcohols, the splitting-off of hydrogen, as is known, takes place between 270° and 320° C., but sometimes at a temperature of not lower than 345° to 350° C. In contrast to this, with tricyclodecane-dimethylol, the splitting-off of hydrogen at 250° C. is terminated in about 20 to 30 minutes. Therefore, with tricyclodecane-dimethylol-4,8, temperatures of 200–260° C. and preferably of 240–250° C. are used for effecting the reaction with molten alkali.

It is preferable to operate in a closed pressure vessel, such as an autoclave and to recover the hydrogen split off for re-use, as, for example, addition reactions. It is possible to continuously remove the hydrogen while maintaining a constant excess pressure, as, for example, of 5 or 10 atmospheres. It is also possible to accumulate the hydrogen under pressure in the autoclave and then to remove the total quantity.

The salt cake obtained from the reaction, as, for example, with potassium hydroxide, will dissolve very rapidly in 3–5 times its quantity of hot water without leaving a residue. The excess of alkali may then be neutralized with mineral acids, as, for example, sulfuric acid, to bring the pH value of the mixture to a pH of about 5–6.5. When so operating, a finely crystalline deposit of potassium sulfate is first formed. This salt deposit carries along with it a small amount of colored impurities of higher molecular weight which, based on the tricyclodecane-dimethylol fed, generally amount to 1.5–2%. The balance of the impurities, which are generally about equal in amount to the amount deposited out with the salt, may be extracted from the solution after having filtered off the potassium sulfate. This extraction may be effected with solvents which are insoluble in water, as, for example, with benzene, or its homologues, higher ketones, esters, or chlorinated hydrocarbons.

Low-cost mineral acids as, for example, hydrochloric acid or sulfuric acid are preferably used for the treatment with acid of the aqueous solutions which may be produced from the products of the reaction with molten alkali. However, other acids as, for example, nitric acid, hydrobromic acid, or suitable acid mixtures may also be used for this purpose. Instead of using mineral acids, the isolation of the free tricyclodecane-dicarboxylic acid-4,8 may also be effected with organic acids as, for example, with formic acid, oxalic acid, chlorinated acetic acids and similar acids.

In order to obtain a white dicarboxylic acid, the extracted salt solution may be decolorized in the conventional manner as by means of adsorbents or by the addition of small amounts of bleaching agents, such as hydrogen peroxides, sodium hyposulfite, or hypochlorites. The brightened or decolorized salt solution is then mixed with additional quantities of mineral acid until a pH of 4 to 2 is obtained, thereby precipitating the dicarboxylic acid. This precipitating first forms with a syrupy consistency. Due to its high specific gravity, the dicarboxylic acid will go to the bottom of the stirring vessel. The highly viscous substance may be dispersed in the acid aqueous solution by vigorous stirring, which will thereby convert the acid into microcrystalline form. Residues of inorganic acid salts formed may be removed from the acid by washing with water.

The tricyclodecane-dicarboxylic acid produced in this manner has the empirical formula $C_{12}H_{16}O_4$ and contains, according to elementary analysis, 64.4% carbon, 7.2% hydrogen, and 28.4% oxygen. The calculated content would be 64.27% carbon, 7.19% hydrogen, and 28.54% oxygen. The acid number of the tricyclodecane-dicarboxylic acid thus formed is 500, and its final melting point is 187° C.

For the commercial production of the tricyclodecane-dicarboxylic acid it is possible to use as the starting product the intermediate products which are obtained in the production of the tricyclodecane-dimethylol, as, for example, raw diol or mixtures thereof with solvents. It also, of course, is possible to effect the reaction in continuous operation.

The tricyclodecane-dicarboxylic acid-4,8 produced in accordance with the invention is a novel substance which was not known up to the present. The acid crystallizes in white crystals. It is little soluble in water, but soluble in hot concentrated nitric acid from which the acid may be recrystallized. The acid is also soluble in ethers (especially dioxane), alcohols, ketones and esters. Tricyclodecane-dicarboxylic acid-4,8 dissolves also without decomposition in formic acid and lower homologues thereof. Its melting point ranges between 170° and 187° C. After recrystallization from hot nitric acid, the melting point ranges between 199° and 202° C. Tricyclodecane-dicarboxylic acid-4,8 may easily be esterified with monohydric and polyhydric alcohols. Tricyclodecane-dimethylol may also be used for the esterification. In addition to esterifications, interchange of ester radicals may also be effected with the new tricyclodecane-dicarboxylic acid-4,8.

The diol esters of the new tricyclodecane-dicarboxylic acid-4,8 may easily be polycondensed. The polycondensation products thereby formed are well suitable for the production of artificial resins. Polyesters of this kind may be used in a manner similar to that of the polyesters of cyclic dicarboxylic acids.

The simple esters with aliphatic alcohols are usable as plasticizers in the same manner as the esters of adipic acid and analogous acids. Tricyclodecane-dicarboxylic acid-4,8, according to the Geneva nomenclature, has the formula tricyclodecane-5,2,1,0$^{2,6}$-dicarboxylic acid-4,8. Referred to the position of the 4 carbon atom, the 8 and 9 carbon atoms of the tricyclodecane-skeleton are equivalent and, therefore, tricyclodecane - dicarboxylic acid-4,8 is identical with tricyclodecane-dicarboxylic acid-4,9.

The following example is given by way of illustration and not limitation:

*Example*

300 grams of tricyclodecane-dimethylol having the characteristics:

| | |
|---|---|
| Density at 50° C | 1.1111 |
| Refractive index $n_D^{50}$ | 1.5210 |
| Neutralization number | 0 |
| Saponification number | 2 |
| Hydroxyl number | 550 |
| Carbonyl number | 5 | and 210 grams potassium hydroxide were placed in an autoclave of 2.5 liters capacity. After having sealed the autoclave, the air was removed by passing through nitrogen. Then the autoclave was heated to 250° C. and maintained at this temperature for 20 minutes. Under these conditions, the pressure in the autoclave increased to 110 kg./sq. cm. corresponding to 125 normal liters of hydrogen split off. After cooling, the hydrogen was released and the reaction mixture was removed from the autoclave. The reaction mixture represented a hard, finely crystalline, soap-like mass which, after comminution, dissolved within a few minutes in 1.2 liters of water while stirring. The slightly turbid, yellowish-brown solution was then mixed with 20% sulfuric acid (about 200–300 cc.) until a pH value of 6.5–5 was reached, thereby precipitating crystalline potassium sulfate. The termination of the neutralization of the free alkali was perceptible as an increase in turbidity caused by the separation of a small amount of dicarboxylic acid. The solution was then filtered from the separated salt, which had caired the colored impurities with it to the bottom, and the filtered solution was subjected to extraction. Due to the small amount of substance involved, a separation funnel was used.

The extraction was effected with 10% by volume of benzene, followed by a second extraction with 5% by volume of benzene. The extracted solution, while being heated to the boiling point, was treated with 1% of a mixture consisting of 1 part tonsil and 2 parts of carbon, and filtered. The solution, which was practically colorless, was mixed with further quantities of 20% sulfuric acid, until the pH value had dropped to below 4, as, for example, to 3. This resulted in the formation of two layers. The lower dicarboxylic acid layer was of a honey-like consistency and the upper layer consisted of aqueous salt solution. Both of the phases were mixed up by intensively stirring, thereby changing the acid into the microcrystalline state. After separation of the dicarboxylic acid from the salt solution, it was washed on a suction filter with distilled water, thereby separating the remainder of crystallized salt from the dicarboxylic acid.

We claim:
1. As a new compound tricyclodecane-dicarboxylic acid-4,8.
2. Process for the production of tricyclodecane-dicarboxylic acid, which comprises contacting tricyclodecane-dimethylol-4,8 with a caustic alkali at a temperature ranging from the melting temperature of said caustic alkali to about 300° C., and recovering a tricyclodecane-dicarboxylic acid salt.
3. Process according to claim 2, in which said contacting is effected at a temperature of about 250–260° C.
4. Process according to claim 2, in which said caustic alkali is present in amount of about 100–150% of the theoretically required quantity.
5. Process according to claim 4, in which said caustic alkali is present in amount of about 110–120% of the theoretically required quantity.
6. Process according to claim 2, in which said tricyclodecane-dicarboxylic acid salt is recovered in the form of a solid salt cake, and which includes dissolving said salt cake in about 3–5 times its quantity of water.
7. Process according to claim 2, in which said recovered tricyclodecane-dicarboxylic acid salt is dissolved in water, the solution formed contacted with mineral acid and free tricyclodecane-dicarboxylic acid recovered.
8. Process according to claim 2, in which the tricyclodecane-dicarboxylic acid salt recovered is dissolved in water the solution formed contacted with an amount of mineral acid to bring the same to a pH of about 5–6.5, and thereby precipitate out an alkali salt, separating the solution from the alkali salt, contacting the solution with an amount of mineral acid to bring the pH to about 2–4, and recovering the free tricyclodecane-dicarboxylic acid formed.
9. Process according to claim 8, in which the solution after said first contacting with mineral acid is extracted with a low-boiling solvent.
10. Process according to claim 9, in which said extracted solution is treated by the addition of a decolorizing agent.
11. Process according to claim 10, in which the free tricyclodecane-dicarboxylic acid obtained after the second contacting with the mineral acid is converted into microcrystalline form by vigorously stirring the solution.
12. Process according to claim 11, in which said microcrystalline tricyclodecane-dicarboxylic acid is washed with water and recovered.
13. Process according to claim 2, in which said caustic alkali is potassium hydroxide.

References Cited in the file of this patent
UNITED STATES PATENTS

| | | |
|---|---|---|
| 1,389,187 | Dupont | Aug. 30, 1921 |
| 2,196,581 | Stephenson | Apr. 9, 1940 |
| 2,437,600 | Gresham et al. | Mar. 9, 1948 |
| 2,448,368 | Gresham et al. | Aug. 31, 1948 |

OTHER REFERENCES
Alder et al.: Annalen, vol. 496, page 212 (1932).